United States Patent
Holt et al.

(10) Patent No.: US 9,423,233 B2
(45) Date of Patent: Aug. 23, 2016

(54) AXIAL DISPLACEMENT AND ROTATIONAL SPEED MONITORING

(75) Inventors: Jonathan E. Holt, Derby (GB); Stephen G. Garner, Ashby-de-la-Zouch (GB); Mark J. E. Bellis, Derby (GB)

(73) Assignee: ROLLS-ROYCE plc, London (GB)

( * ) Notice: Subject to any disclaimer, the term of this patent is extended or adjusted under 35 U.S.C. 154(b) by 833 days.

(21) Appl. No.: 13/703,909

(22) PCT Filed: Jun. 14, 2011

(86) PCT No.: PCT/EP2011/059800
§ 371 (c)(1),
(2), (4) Date: Dec. 13, 2012

(87) PCT Pub. No.: WO2012/004091
PCT Pub. Date: Jan. 12, 2012

(65) Prior Publication Data
US 2013/0094966 A1    Apr. 18, 2013

(30) Foreign Application Priority Data

Jul. 6, 2010  (GB) .................................. 1011349.6

(51) Int. Cl.
*G01B 7/14* (2006.01)
*B64C 11/30* (2006.01)
(Continued)

(52) U.S. Cl.
CPC . *G01B 7/14* (2013.01); *B64C 11/30* (2013.01); *B64C 11/306* (2013.01);
(Continued)

(58) Field of Classification Search
CPC ...... G01B 7/14; G01B 7/003; F04D 27/0246; F04D 29/36; F04D 29/362; B64C 11/30; B64C 11/306; B64D 2027/005; Y02T 50/66; G01D 5/2216; G01P 3/488
USPC ........................................................... 416/61
See application file for complete search history.

(56) References Cited

U.S. PATENT DOCUMENTS

| | | | |
|---|---|---|---|
| 3,307,164 A | | 2/1967 | Zimmer |
| 3,873,235 A | * | 3/1975 | Mendelson ............... F01D 7/00 416/154 |
| 4,833,405 A | | 5/1989 | Richards et al. |
| 4,934,192 A | | 6/1990 | Jenkins |

(Continued)

FOREIGN PATENT DOCUMENTS

| DE | 199 08 036 A1 | 8/2000 |
|---|---|---|
| EP | 0 353 076 A2 | 1/1990 |

(Continued)

OTHER PUBLICATIONS

Nov. 5, 2010 Search Report issued in British Application No. 1011349.6.

(Continued)

*Primary Examiner* — Dwayne J White
*Assistant Examiner* — Aaron R Eastman
(74) *Attorney, Agent, or Firm* — Oliff PLC

(57) ABSTRACT

An apparatus, for example for a pitch change mechanism, includes a cylinder having a magnetic portion defining an annular array of features extending parallel to the longitudinal axis of the cylinder, the cylinder rotating in use and able to translate longitudinally. There is a sensing arrangement including a stationary magnetised core and two coils connected in series and wound around the core. In use, the cylinder rotates and current is induced in the coils. Monitoring equipment is arranged to calculate rotational speed of the cylinder from the frequency of the current and to calculate longitudinal position from the relative amplitude of the current in each coil. Also a method.

16 Claims, 3 Drawing Sheets

(51) Int. Cl.
*F04D 29/36* (2006.01)
*G01B 7/00* (2006.01)
*G01D 5/22* (2006.01)
*G01P 3/488* (2006.01)
*F04D 27/02* (2006.01)
*B64D 27/00* (2006.01)

(52) U.S. Cl.
CPC ............ *F04D 27/0246* (2013.01); *F04D 29/36* (2013.01); *F04D 29/362* (2013.01); *G01B 7/003* (2013.01); *G01D 5/2216* (2013.01); *G01P 3/488* (2013.01); *B64D 2027/005* (2013.01); *Y02T 50/66* (2013.01)

(56) References Cited

U.S. PATENT DOCUMENTS

| | | | |
|---|---|---|---|
| 4,982,156 A | 1/1991 | Lewis et al. | |
| 5,229,715 A | 7/1993 | Niino et al. | |
| 7,042,210 B2 * | 5/2006 | Matsukawa | G01B 7/003 324/207.2 |
| 2002/0118011 A1 * | 8/2002 | Wolf | G01B 7/003 324/207.2 |
| 2005/0206910 A1 * | 9/2005 | Schroeder | G01B 7/001 356/614 |
| 2008/0303515 A1 * | 12/2008 | Wolf | G01B 7/003 324/207.24 |
| 2009/0224750 A1 * | 9/2009 | Hosek | G01B 7/003 324/207.13 |
| 2010/0068056 A1 * | 3/2010 | Gainford | B64C 11/306 416/1 |

FOREIGN PATENT DOCUMENTS

| | | |
|---|---|---|
| FR | 2 590 989 A1 | 6/1987 |
| GB | 2 181 246 A | 4/1987 |
| GB | 2465575 A | 5/2010 |
| SU | 544856 | 1/1977 |

OTHER PUBLICATIONS

Sep. 22, 2011 International Search Report issued in International Patent Application No. PCT/EP2011/059800.

* cited by examiner

AXIAL DISPLACEMENT AND ROTATIONAL SPEED MONITORING

The present invention relates to monitoring axial displacement and rotational speed of a rotating cylinder that translates. In particular, it finds utility for monitoring the rotational speed of a propeller rotor stage and for monitoring the change in pitch of the rotor blades.

GB 2465575 discloses a displacement measuring apparatus for monitoring the axial displacement and rotational speed of a rotating cylinder that translates. It has utility for a rotating pitch change mechanism for a propeller rotor stage. A cylinder comprises an array of longitudinal grooves alternating with an array of angled grooves. A speed probe sensor is arranged to generate a signal pulse for each groove that passes the sensor as the cylinder rotates. The time between pulses generated by the longitudinal grooves is used to calculate the rotational speed of the cylinder whilst the time between an adjacent pair of grooves, one longitudinal and one angled, is used to calculate the axial displacement of the cylinder. For the rotating pitch change mechanism application, the axial displacement corresponds to change of pitch of the rotor blades.

One disadvantage of this apparatus is that the bandwidth of measurement, the number of pulse pairs per unit time, is restricted. This is because each pair of grooves, one angled and one longitudinal, uses a relatively large proportion of the circumference of the cylinder and therefore few pairs of grooves are possible.

The present invention seeks to provide apparatus and a method that addresses the aforementioned problems.

Accordingly the present invention provides apparatus comprising a cylinder having a magnetic portion defining an annular array of features extending parallel to the longitudinal axis of the cylinder, the cylinder rotating in use and able to translate longitudinally; and a sensing arrangement comprising a stationary magnetised core arranged parallel to the features; and two coils connected in series via a common terminal and wound around the core, the common terminal of the coils and the other terminal of each coil connected to monitoring equipment; such that in use the cylinder rotates and current is induced in the coils by the cyclic variation of magnetic flux in the core; the monitoring equipment is arranged to calculate rotational speed of the cylinder from the frequency of the current and to calculate longitudinal position of the cylinder from the relative amplitude of the current in each coil.

Advantageously the same sensing equipment is used to derive both the rotational speed and the longitudinal position of the cylinder. Rotation of the cylinder induces the current so that no separate excitation is required.

The apparatus may comprise a pitch change monitoring apparatus.

The coils may be arranged to be rotationally de-coupled from the cylinder and longitudinally coupled to the cylinder. The coils may be longitudinally coupled and rotationally de-coupled by bearings.

The features may comprise grooves or ridges.

The present invention also provides a gas turbine engine, wherein the cylinder rotates in synchronicity with the rotor and translates in response to change of pitch of the rotor blades.

The monitoring equipment may comprise an engine electronic controller (EEC).

The present invention also provides a method of monitoring rotational speed and longitudinal position of a cylinder that rotates in use about its longitudinal axis and can translate longitudinally, the cylinder having a magnetic portion defining an annular array of features extending parallel to the longitudinal axis; the method comprising: providing a sensing arrangement comprising a stationary magnetised core arranged parallel to the features and two coils connected in series and wound around the core such that a variable magnetic flux is induced in the core and a current is induced in the coils by the passing of the features in use; calculating the rotational speed of the cylinder from the frequency of the current induced in the coils; and calculating the longitudinal position of the cylinder from the relative amplitude of the current in each coil.

Beneficially both the rotational speed and longitudinal position of the cylinder can be derived from a single sensing arrangement in which current is induced without requiring separate excitation.

The present invention also provides a gas turbine engine having a rotor comprising an array of variable pitch rotor blades, and comprising a method as described.

The present invention will be more fully described by way of example with reference to the accompanying drawings, in which.

Figure 1:
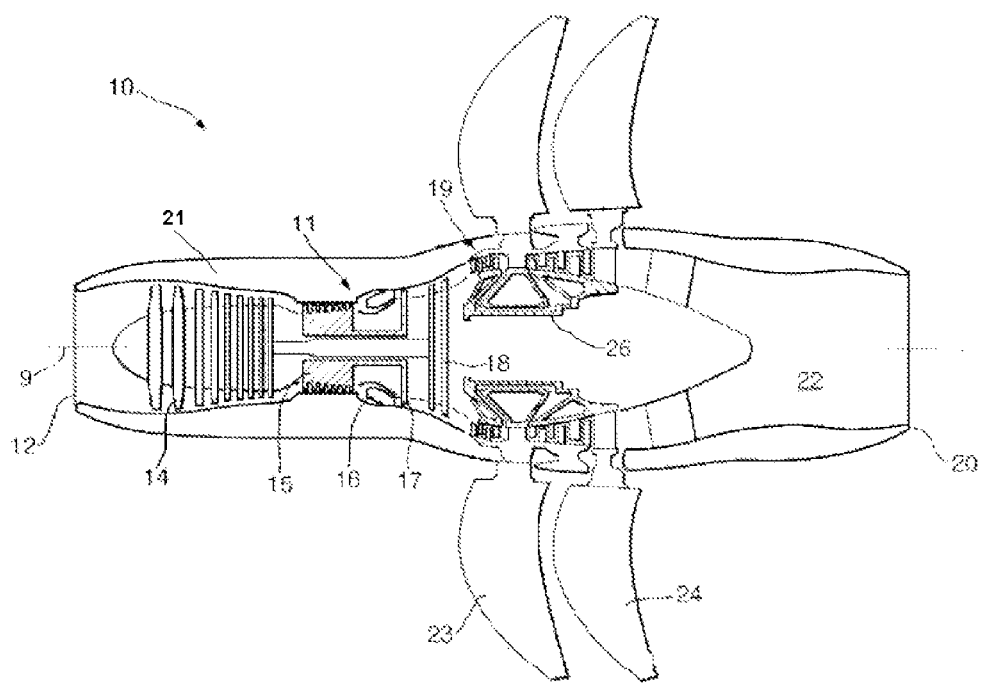
FIG. 1 is a sectional side view of a gas turbine engine having contra-rotating propeller stages.

Referring to FIG. 1, a twin-spooled, contra-rotating propeller gas turbine engine is generally indicated at 10 and has a principal rotational axis 9. The engine 10 comprises a core engine 11 having, in axial flow series, an air intake 12, an intermediate pressure compressor 14, a high-pressure compressor 15, combustion equipment 16, a high-pressure turbine 17, an intermediate pressure turbine 18, a free power (or low-pressure) turbine 19 and a core exhaust nozzle 20. A nacelle 21 generally surrounds the core engine 11 and defines the intake 12 and nozzle 20 and a core exhaust duct 22. The engine 10 also comprises two contra-rotating propeller stages 23, 24 attached to and driven by the free power turbine 19 via shaft 26.

The gas turbine engine 10 works in a conventional manner so that air entering the intake 12 is accelerated and compressed by the intermediate pressure compressor 14 and directed into the high-pressure compressor 15 where further compression takes place. The compressed air exhausted from the high-pressure compressor 15 is directed into the combustion equipment 16 where it is mixed with fuel and the mixture combusted. The resultant hot combustion products then expand through, and thereby drive the high-pressure, intermediate pressure and free power turbines 17, 18, 19 before being exhausted through the nozzle 20 to provide some propulsive thrust. The high-pressure, intermediate pressure and free power turbines 17, 18, 19 respectively drive the high and intermediate pressure compressors 15, 14 and the propellers 23, 24 by suitable interconnecting shafts. The propellers 23, 24 normally provide the majority of the propulsive thrust. In the embodiments herein described the propellers 23, 24 rotate in opposite senses so that one rotates clockwise and the other anti-clockwise around the engine's rotational axis 9.

The propellers 23, 24 each comprise an annular array of rotor blades. Each rotor blade is attached to a hub by a spindle about which the blade can be rotated to change the pitch of the blade and therefore the angle of attack of the blade to the airflow. Each rotor blade may be rotated about its spindle separately. More preferably groups of rotor blades, up to the full set of rotor blades forming the propeller stage 23, 24, may be ganged together to be rotated synchronously. It is advantageous to monitor the pitch of the rotor blades and the speed of rotation of the propeller stage 23, 24 and to provide this data via a feedback loop to a control system.

For a contra-rotating propeller gas turbine engine 10 it is beneficial to locate monitoring and control equipment in the stationary (non-rotating), engine frame of reference so that the control and monitoring signals do not have to cross the rotating-stationary interface. This is particularly pertinent for the rear rotor stage 24 as otherwise the signal must cross the rotating-stationary interface and, potentially, also the rotating-rotating interface between the front and rear contra-rotating propeller stages 23, 24.

Figure 2:
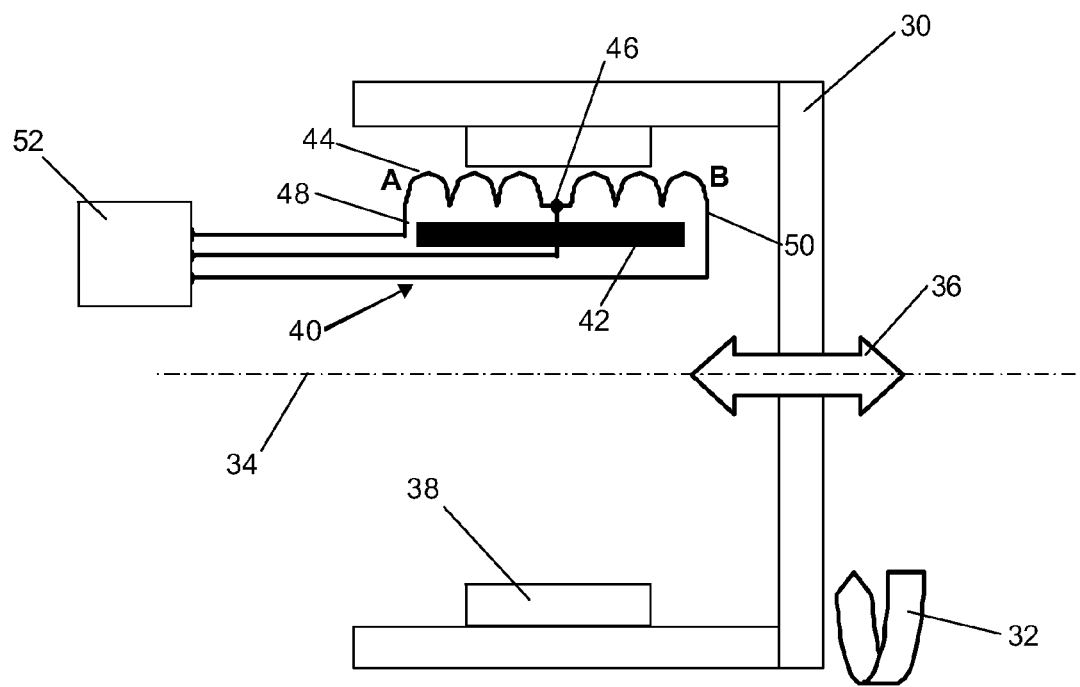
FIG. 2 is a schematic cross section of a first embodiment of a pitch change monitoring apparatus according to the present invention.

An exemplary first embodiment of the present invention is shown in FIG. 2 and described with respect to the pitch change mechanism of a contra-rotating propeller gas turbine engine 10. A cylinder 30 rotates in the direction of arrow 32 about a longitudinal axis 34. The cylinder 30 is arranged to rotate synchronously with the rotation of the propeller rotor stage 23, 24 with which it is coupled. Therefore the rotational speed of the cylinder corresponds to the rotational speed of the propeller stage 23, 24. The cylinder 30 can be translated as indicated by double-headed arrow 36. The linear translation is related by a known relationship to the angular displacement of each rotor blade around its spindle to effect pitch change of the rotor blades.

The cylinder 30 includes a magnetic portion 38 that, in the first embodiment, is an annular portion that extends from the inner surface of the cylinder 30. The magnetic portion 38 may be coupled to the cylinder 30 or integrally formed therewith. Thus the magnetic portion 38 moves in concert with the cylinder 30 and cannot move independently therefrom. The axial length of the magnetic portion 38 is less than the axial length of the cylinder 30 and it is positioned intermediate the axial ends of the cylinder 30. The magnetic portion 38 comprises an array of axially extending grooves or ridges that are equally spaced around its inner periphery.

A sensing arrangement 40 is provided that is mounted from stationary components of the engine 10 that are not shown in FIG. 2. The sensing arrangement 40 is located within the cylinder 30 radially closer to the cylinder 30 than the axis 34. It comprises a stationary magnetised core 42 that is arranged to extend axially and to be parallel to the grooves or ridges on the magnetic portion 38. The magnetised core 42 is longer in the axial direction than the magnetic portion 38 but has a relatively small circumferential extent.

The sensing arrangement 40 also comprises two electrical coils 44, coil A and coil B, that are connected in series via a common terminal 46. Each coil A, B has another terminal 48, 50 at the opposite end to the common terminal 46. The common terminal 46 and the other terminals 48, 50 are coupled, via signal lines or wires, to monitoring equipment 52 that may be located anywhere suitable in the engine 10. For example, the monitoring equipment 52 may form part of an engine electronic controller, of an engine monitoring arrangement or may be a separate component.

In use the cylinder 30 rotates in the direction of arrow 32 at a given speed. Thus the grooves or ridges on the magnetic portion 38 pass the magnetised core 42 and the coils A, B at that given speed. The magnetic flux of the magnetised core 42 varies as each groove or ridge passes or the unmarked magnetic portion 38 passes the sensing arrangement 40. The change in magnetic flux excited in the magnetised core 42 induces a current in the coils A, B. The frequency of the current is proportional to the rotational speed of the cylinder 30. Therefore the monitoring equipment 52 is arranged to calculate the rotational speed of the cylinder 30 from the frequency across any two of the terminals 46, 48, 50.

For redundancy and measurement checking it is beneficial to measure the frequency between the coil A terminal 48 and the common terminal 46, and also between the coil B terminal 50 and the common terminal 46, and compare the two measurements. If the measurements differ by more than a predetermined amount it must be assumed that there is a measurement error and that the calculated rotational speed may be erroneous. Alternatively or additionally the frequency may be measured between the coil A terminal 48 and the coil B terminal 50 and compared to one or both of the other measurements.

When the cylinder 30 is in the neutral axial position as shown in FIG. 2, the magnetic portion 38 of the cylinder 30 is equally aligned with coil A and coil B. Thus the amplitude of the current measured across each coil A, B is the same. In use, the cylinder 30 translates axially, left or right as illustrated, in the direction of double-headed arrow 36. When the cylinder 30 translates to the right the magnetic portion 38 is axially aligned with an increasing amount of coil B, up to the whole of coil B. Consequently, the magnetic portion 38 is axially aligned with a decreasing amount of coil A, ultimately none of coil A. Thus the relative amplitude of the current in each coil A, B changes so that the amplitude of the current in coil B increases and the amplitude of the current in coil A decreases, whilst the sum of the amplitudes remains constant. There is advantage in arranging the magnetic portion 38 to be sufficiently longer than the length of the series of coils A, B so that some part of each coil A, B is always overlapped by the magnetic portion 38. This puts the non-linearity at the ends of the magnetic portion 38 outside the range of translation.

The monitoring equipment 52 calculates the axial or longitudinal displacement of the cylinder 30 from the relative amplitude of the current in coil A and coil B. Conversely, when the cylinder 30 is translated to the left, the amplitude of the current in coil A increases and the amplitude of the current in coil B decreases.

In the pitch change application, the cylinder 30 is translated by rotation of the rotor blades about their spindles. Translation of the cylinder 30 in one direction is the result of the rotor blades having finer pitch whilst translation in the other direction results from the rotor blades having coarser pitch. It will be apparent to the skilled reader that the magnetic portion 38 and the components of the sensing arrangement 40 may be relatively sized to enable good resolution of the frequency and amplitude of the current in each of the coils A, B for any desired position of the cylinder 30. It will be understood that in the pitch change application the translation of the cylinder 30 may be limited corresponding to the limit stops that prevent excessive rotation of the rotor blades.

The sensing arrangement 40 combines the functionality of a variable reluctance speed probe and a linear variable differential transformer (LVDT). The speed probe comprises one of the coils A, B plus the magnetised core 42 and the grooves or ridges on the magnetic portion 38. The LVDT comprises the relative positions of the coils A, B and the magnetic portion 38. The speed probe drives the LVDT so that the sensing arrangement 40 is self-exciting. Thus no external excitation mechanism is required, saving weight, cost and complexity.

Figure 3:
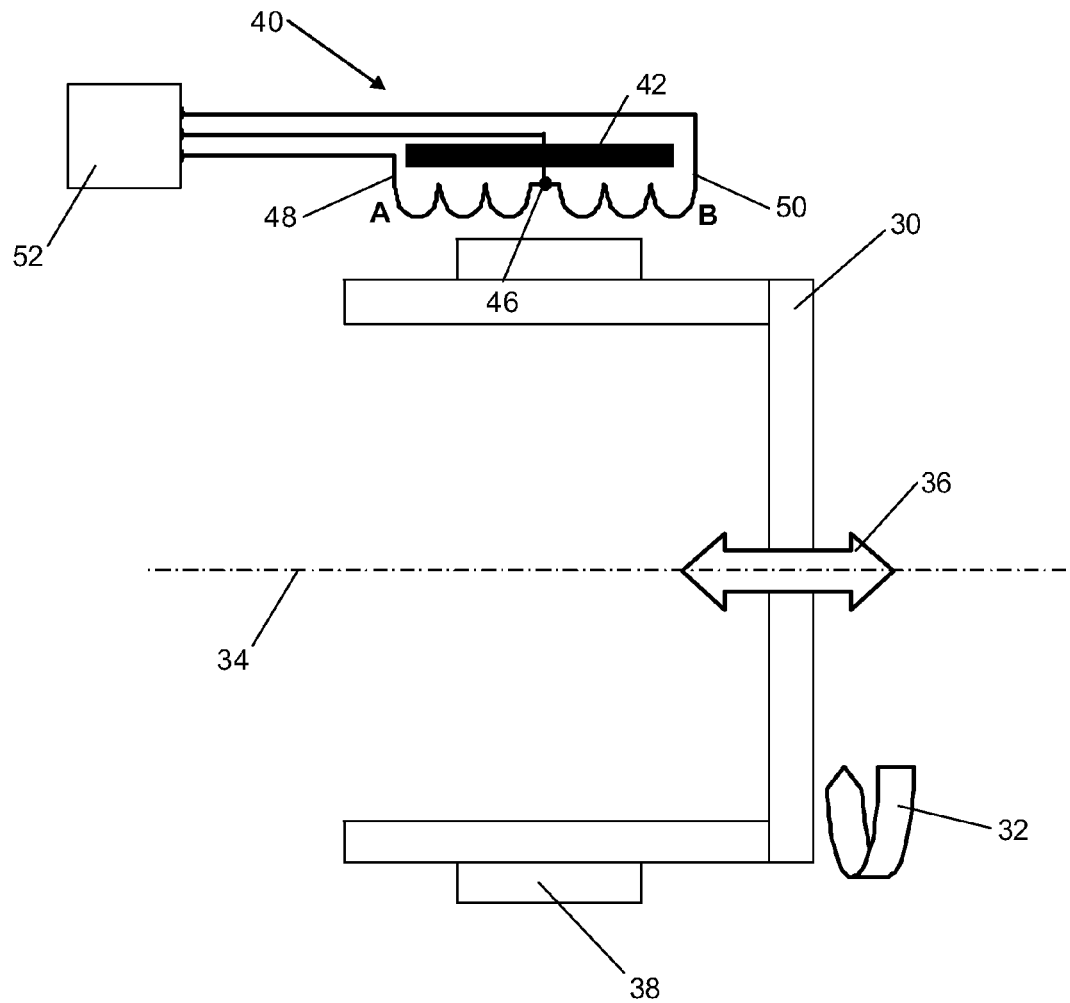
FIG. 3 is a schematic cross section of a second embodiment of a pitch change monitoring apparatus according to the present invention.

FIG. 3 shows a second embodiment of the apparatus of the present invention which differs from the first embodiment in that the sensing arrangement 40 is located radially outside the cylinder 30. Similarly the magnetic portion 38 is located on the external surface of the cylinder 30. In all other respects the second embodiment is the same as the first embodiment and functions in the same manner.

Figure 4:
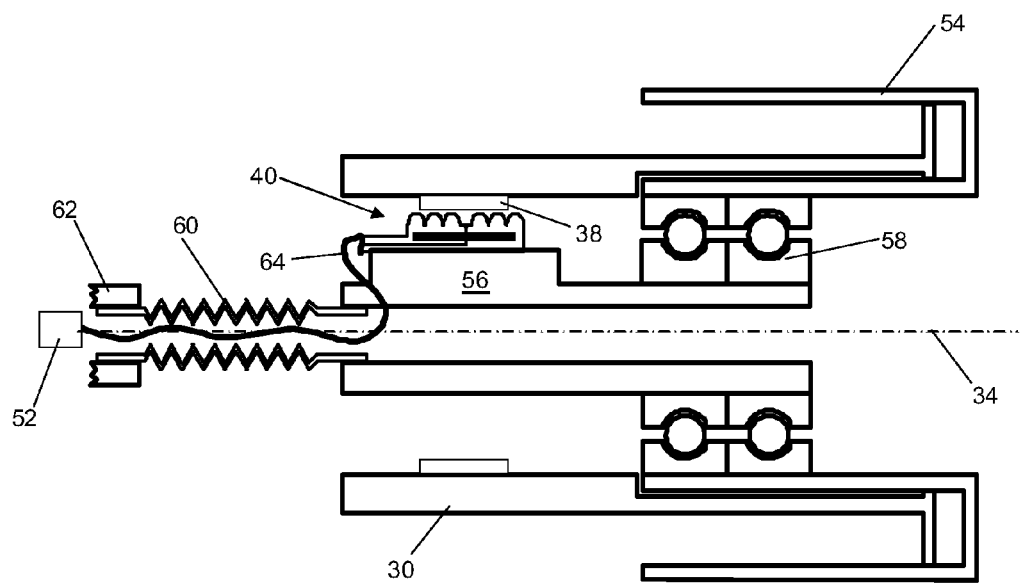
FIG. 4 is a schematic cross section of a third embodiment of a pitch change monitoring apparatus according to the present invention.

A third embodiment of the present invention is shown in FIG. 4, which is substantially the same as the first embodiment. The cylinder 30 is able to rotate in use about the longitudinal axis 34 and can translate by operation of a piston arrangement 54. The internal surface of the cylinder 30 comprises the magnetic portion 38. Stationary structure 56 is located radially inwardly of the cylinder 30 and is axially coupled to the piston arrangement 54 by bearings 58. The stationary structure 56 is coupled via a flexible coupling 60 to another stationary component 62 such as a central oil tube of the engine 10. The bearings 58 enable the piston arrangement 54 and cylinder 30 to rotate relative to the stationary structure 56, in synchronicity with the rotation of the propeller rotor stage 23, 24, whilst coupling the rotating and stationary components to prevent relative movement in an axial sense.

The sensing arrangement 40 is mounted to the stationary structure 56 and functions in the same way as the first embodiment. The common terminal 46 and the other terminals 48, 50 are coupled to the monitoring equipment 52 via wires 64 that pass through the flexible coupling 60. It will be apparent to the skilled reader that the wires 64 must incorporate sufficient slack to accommodate any longitudinal movement, axial misalignment and relative vibration between the stationary structure 56 and other parts of the engine 10.

Although a single sensing arrangement 40 is shown in the figures and described, it should be understood that more than one sensing arrangement 40 can be provided in an annular array around the cylinder 30. This is beneficial as it provides signal redundancy and cross-checking, although it may add a small weight penalty which is important in some applications including propeller gas turbine engines 10 for aircraft.

Figure 5:
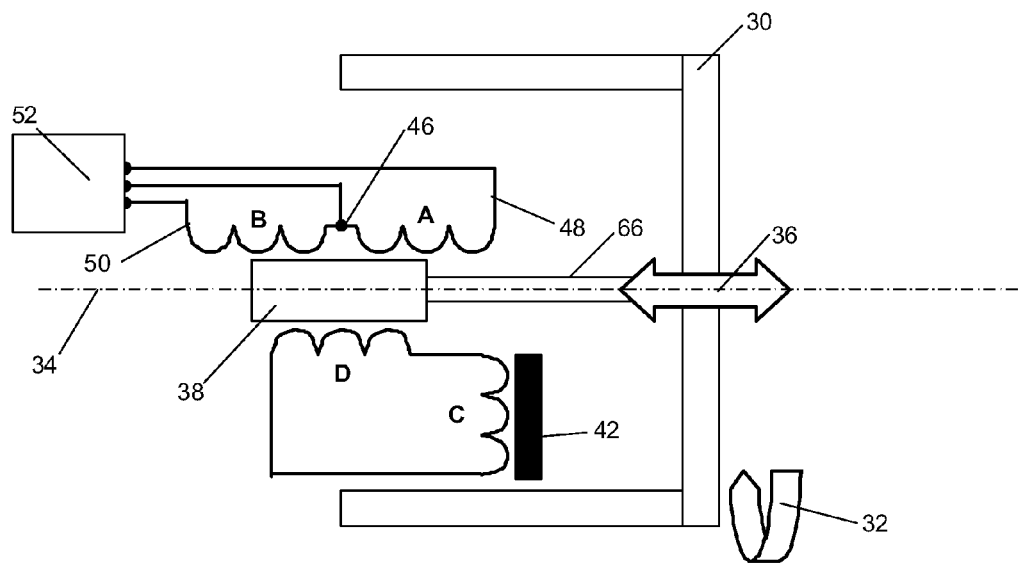
FIG. 5 is a schematic cross section of a fourth embodiment of a pitch change monitoring apparatus according to the present invention.

FIG. 5 shows a fourth embodiment of the present invention. As in previous embodiments, the cylinder 30 rotates around the longitudinal axis 34 in the direction of arrow 32 and translates in the directions of double-headed arrow 36. The inner surface of the cylinder 30 comprises an annular array of axially extending grooves or ridges as in previous embodiments. The cylinder 30 also comprises a central bar 66 that is integral with or permanently coupled to the cylinder 30. The central bar 66 therefore rotates and translates with the cylinder 30. Mounted to or forming part of the central bar 66 is a magnetic portion 38, for example comprising iron. The magnetised core 42 is held stationary inside the cylinder 30 and is arranged to extend radially towards the inner surface of the cylinder 30 close enough to experience changing flux as the grooves or ridges rotate past.

Coil C is positioned close to the magnetised core 42 and extends over substantially the same radial extent. The changing flux in the magnetised core 42 induces current in coil C that alternates at the same frequency as the cylinder 30 rotates, or at a multiple of that frequency, the multiple being dependent on the number of grooves or ridges in the magnetic portion 38. Coil C is connected in a series loop to coil D which therefore experiences the same alternating current. Coil D is located close to the rotating magnetic portion 38 on the central bar 66 and has a similar axial extent thereto. Thus the alternating current in coil D induces an oscillating magnetic flux in the magnetic portion 38 as it rotates. This in turn induces an alternating current in coils A and B, which are coupled in series via common terminal 46 and extend parallel to the magnetic portion 38. Coil A has another terminal 48 and coil B has another terminal 50. The common terminal 46 and the other two terminals 48, 50 are coupled via wires to monitoring equipment 52. Coils A and B function in the same manner as in previous embodiments so that the frequency of the current across one of the coils A, B or between the terminals 48, 50 is measured and used to calculate the speed of rotation of the cylinder 30. The relative amplitude of the current in each coil A, B is measured and used to calculate the axial translation of the cylinder 30.

The grooves or ridges may incorporate a reference feature so that a once per revolution signal is generated. Thus, the phase of the rotation of the cylinder 30 can also be measured and monitored by the monitoring equipment 52.

It may be beneficial to divide magnetic portion 38 into a number of discrete portions around the circumference of the cylinder 30. The number of portions may equal the number of sensing arrangements 40, or be a multiple or integer fraction thereof. Alternatively a different number of discrete portions could form the magnetic portion 38, depending on whether there is magnetic interference or coupling or any requirement for segregation between the signals of sensing arrangements 40.

Although the present invention has been described in relation to the pitch change mechanism of a propeller gas turbine engine 10, it finds equal utility for other applications. In particular, it may be used for the pitch change mechanism for helicopter rotor blades, for ship propellers or thrusters, for wind turbines, for wave or tidal power turbines, or for hydroelectric turbines. All of these applications would benefit from being able to monitor a rotating pitch change mechanism from a stationary frame of reference, as provided by the present invention.

The present invention also finds utility for rotating communications antennae, such as RADAR. In such applications the antennae rotate and both rotational speed and another parameter that is proportional to longitudinal displacement are to be measured.

The invention claimed is:

1. An apparatus comprising:
a cylinder having a magnetic portion defining an annular array of features extending parallel to the longitudinal axis of the cylinder, the cylinder rotating in use and able to translate longitudinally; and
a sensing arrangement comprising (i) a stationary magnetised core arranged parallel to the features and (ii) two coils connected in series via a common terminal and wound around the core, the common terminal of the coils and another terminal of each of the coils being connected to monitoring equipment; wherein:
in use the cylinder rotates and current is induced in the coils by the cyclic variation of magnetic flux in the core; and
the monitoring equipment is arranged to calculate rotational speed of the cylinder from the frequency of the current and to calculate longitudinal position of the cylinder from the relative amplitude of the current in each of the coils.

2. The apparatus as claimed in claim 1, further comprising a pitch change monitoring apparatus.

3. The apparatus as claimed in claim 1, wherein the coils are arranged to be rotationally de-coupled from the cylinder and longitudinally coupled to the cylinder.

4. The apparatus as claimed in claim 3, wherein the coils are longitudinally coupled and rotationally de-coupled by bearings.

5. The apparatus as claimed in claim 1, wherein the features comprise grooves or ridges.

6. A gas turbine engine comprising:
   a rotor comprising an array of variable pitch rotor blades; and
   the apparatus as claimed in claim 1.

7. The gas turbine engine as claimed in claim 6, wherein the cylinder rotates in synchronicity with the rotor and translates in response to change in pitch of the rotor blades.

8. The gas turbine engine as claimed in claim 6, wherein the monitoring equipment comprises an engine electronic controller.

9. The apparatus as claimed in claim 1, wherein the axial length of the stationary magnetized core is greater than that of the magnetic portion.

10. The apparatus as claimed in claim 1, wherein the two coils share a common axis.

11. The apparatus as claimed in claim 1, wherein axes of the two coils are parallel to the longitudinal axis of the cylinder.

12. A method of monitoring rotational speed and longitudinal position of a cylinder that rotates in use about its longitudinal axis and can translate longitudinally, the cylinder having a magnetic portion defining an annular array of features extending parallel to the longitudinal axis, the method comprising:
   providing a sensing arrangement comprising (i) a stationary magnetised core arranged parallel to the features and (ii) two coils connected in series and wound around the core such that a variable magnetic flux is induced in the core and a current is induced in the coils by the passing of the features in use;
   calculating the rotational speed of the cylinder from the frequency of the current induced in the coils; and
   calculating the longitudinal position of the cylinder from the relative amplitude of the current in each of the coils.

13. The method as claimed in claim 12, wherein the cylinder comprises an array of variable pitch rotor blades that constitute a rotor of a gas turbine engine.

14. The method as claimed in claim 12, wherein the axial length of the stationary magnetized core is greater than that of the magnetic portion.

15. The method as claimed in claim 12, wherein the two coils share a common axis.

16. The method as claimed in claim 12, wherein axes of the two coils are parallel to the longitudinal axis of the cylinder.

* * * * *